United States Patent
Takahashi et al.

(10) Patent No.: US 6,907,536 B2
(45) Date of Patent: Jun. 14, 2005

(54) INTEGRATED CIRCUIT FOR IMAGE PICKUP DEVICE

(75) Inventors: Tatsuya Takahashi, Ogaki (JP); Seiji Takeuchi, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 649 days.

(21) Appl. No.: 10/100,634

(22) Filed: Mar. 15, 2002

(65) Prior Publication Data

US 2002/0144161 A1 Oct. 3, 2002

(30) Foreign Application Priority Data

Mar. 29, 2001 (JP) .................................. 2001-094727

(51) Int. Cl.[7] .................. G06F 1/32; H04N 7/083; H04N 7/084; H04N 7/087
(52) U.S. Cl. .................. 713/324; 713/300; 713/323; 348/476; 348/477
(58) Field of Search .................. 713/300, 323, 713/324; 348/333.01, 476, 477

(56) References Cited

U.S. PATENT DOCUMENTS

| | | | | |
|---|---|---|---|---|
| 4,910,413 A | * | 3/1990 | Tamune .................. | 250/578.1 |
| 4,945,424 A | * | 7/1990 | Hiroki et al. .................. | 386/118 |
| 4,953,028 A | * | 8/1990 | Murayama et al. .......... | 348/308 |
| 5,371,540 A | * | 12/1994 | Tamura et al. ........... | 348/222.1 |
| 6,272,030 B1 | * | 8/2001 | Oomura .................. | 363/62 |

FOREIGN PATENT DOCUMENTS

| | | |
|---|---|---|
| DE | 4035574 A1 | 5/1991 |
| JP | 63-126371 | 5/1988 |

* cited by examiner

*Primary Examiner*—Lynne H. Browne
*Assistant Examiner*—Edward K. Park
(74) *Attorney, Agent, or Firm*—Hogan & Hartson, LLP

(57) ABSTRACT

A design for reducing the power dissipation in an integrated circuit for an image pickup device. Placing a circuit block (2), such as for generating a driving signal to an image pickup apparatus, in a standby state within a vertical blanking period or horizontal blanking period reduces the power dissipation at the circuit block (2). Since the blanking period is short, it is necessary to rapidly restore normal operation from standby so as to ensure the standby time. A switch (6) is provided between a terminal of the circuit block (2) and a capacitor (4) that is provided for voltage regulation at the terminal. A controller (8) turns off the switch (6) and disconnects the capacitor (4) from the circuit block (2) in a period where the circuit block (2) is placed in a standby state. As a result, variations in the amount of stored charge in the capacitor (4) during standby are suppressed, and while resetting to normal operation the time for returning the capacitor (4) to the amount of stored charge for normal operation is shortened so that the reset operation is performed rapidly.

3 Claims, 3 Drawing Sheets

INTEGRATED CIRCUIT FOR IMAGE PICKUP DEVICE

BACKGROUND OF THE INVENTION

1. Field of the Invention

The present invention relates to an integrated circuit for an image pickup device, where the integrated circuit is to be used for driving an image pickup apparatus or for the signal processing of picture signals obtained from the image pickup apparatus, and more particularly to a reduction in the power dissipation of the image pickup apparatus.

2. Description of the Related Art

In order to miniaturize various portable equipment, a smaller sized battery is also used for loading into the equipment. Lower power dissipation is also designed so that a sufficient operating time is possible with a small battery of small capacity. In like manner, low power dissipation and compact size are desirable features in digital still cameras and video cameras. Furthermore, as the communication capacity has expanded in recent years, it has become possible for cellular phones and portable terminals to handle graphics, and it has become desirable for these equipments to include an image pickup function. These cellular phones are becoming more compact and require a further reduction in power dissipation.

Heretofore, a reduction in the driving voltage for CCD (Charge Coupled Device) image sensors or in the driving voltage for analog signal processing circuits for processing the output signal of image sensors were designed, and further a standby function was employed. Incidentally, the standby function is assumed to be a state in which the drive operation of the main circuitry for image pickup is stopped during a period where image pickup is not performed, even if the main power switch is in the on state. For example, the image pickup in a digital still camera is basically performed on an intermittent basis. In this case, the interval period between image pickup operations is long so that a larger effect in the reduction of power dissipation can be obtained from the standby function. Furthermore, in particular, unlike the digital signal processing circuit, an analog signal processing circuit requires a steady current during operation and the power dissipation is large, thereby making the standby function effective.

Although several techniques have been adopted in the past as described above to lower the power dissipation, the further lowering of power dissipation has become a technical problem.

SUMMARY OF THE INVENTION

It is therefore an object of the present invention to solve this problem and provide an integrated circuit for an image pickup device for achieving lower power dissipation by extending the standby time.

The integrated circuit for the image pickup device relating to the present invention is connected to the image pickup device, operates in synchronization with at least one of either the horizontal scan or vertical scan for the image pickup device, and comprises a circuit block for at least one of either supplying a driving signal to the image pickup device or processing an output signal from the image pickup device, a switch for selectively interrupting an output of the circuit block, and a controller for placing operation of the circuit block into a halt state and turning off the switch in at least one of either a horizontal scan blanking period or a vertical scan blanking period of the image pickup device. The state of an output of the circuit block that was extracted immediately prior to turning off the switch is maintained by a predetermined capacitance during at least one of either the horizontal scan blanking period or the vertical scan blanking period of the image pickup device.

A capacitor is provided between a terminal of the circuit block and a standard voltage, such as ground. The capacitor absorbs the variations in the DC offset voltage that appear at the terminal during operation of the circuit block and regulates the voltage. The capacitor is in a steady state during operation of the circuit block and maintains the voltage at the terminal to a predetermined level. However, when the operation of the circuit block is stopped in the prior art, the inward or outward flow of charges via the circuit block causes the amount of stored charge in the capacitor to vary so that the voltage across the capacitor generally varies from the steady-state voltage. For this reason, even if the drive operation of the circuit block is started next, a relatively long time is required until the voltage at the terminal reaches a voltage required for normal operation. In the vertical blanking period or the horizontal blanking period of the image pickup apparatus, it is generally not necessary to supply drive pulses to the image pickup apparatus and the read out of signal charges is not performed. According to the present invention, in the vertical blanking period or the horizontal blanking period, the circuit block generating driving signals to the image pickup apparatus or the circuit block performing processing on the output signal from the image pickup apparatus can be placed in the standby state so as to suppress the power dissipation. Since the vertical blanking period or the horizontal blanking period is a relatively short period of time, it is necessary to accelerate the restoring operation from the standby state of the circuit block to the normal operating state and to achieve a long standby state so that a sufficient effect in the reduction of power dissipation is obtained. In the present invention, a switch is provided to switch the interruption of the capacitor for the circuit block. When placing the circuit block in the standby state, the switch is turned off and the capacitor is disconnected from the circuit block. When restoring normal operation, the switch is turned on and the capacitor is again connected to the circuit block. This suppresses any change in the amount of stored charge of the capacitor during the standby state so that when the switch is turned on the terminal of the circuit block rapidly returns to the voltage required for normal operation, thereby accelerating the restoration of normal operation.

The integrated circuit for the image pickup device relating to the present invention can be configured so that within at least one of either the vertical blanking period or the horizontal blanking period the controller changes the circuit block to the halt state after the switch is turned off.

According to this configuration, the capacitor is already disconnected from the circuit block at the start of the standby state of the circuit block. Thus, this assures that the change in the amount of stored charge of the capacitor via the circuit block at the start of the standby state can be prevented.

The integrated circuit for the image pickup device relating to the present invention can also be configured so that within at least one of either the vertical blanking period or the horizontal blanking period the controller turns on the switch after resuming the drive operation of the circuit block.

According to this configuration, when the capacitor has been connected to the circuit block, the circuit block has already resumed the drive operation. Thus, this assures that the change in the amount of stored charge of the capacitor via the circuit block at the start of the resumption of the drive operation can be prevented.

DETAILED DESCRIPTION OF THE PREFERRED EMBODIMENTS

Embodiments of the present invention will be described next with reference to the drawings.

Figure 1:
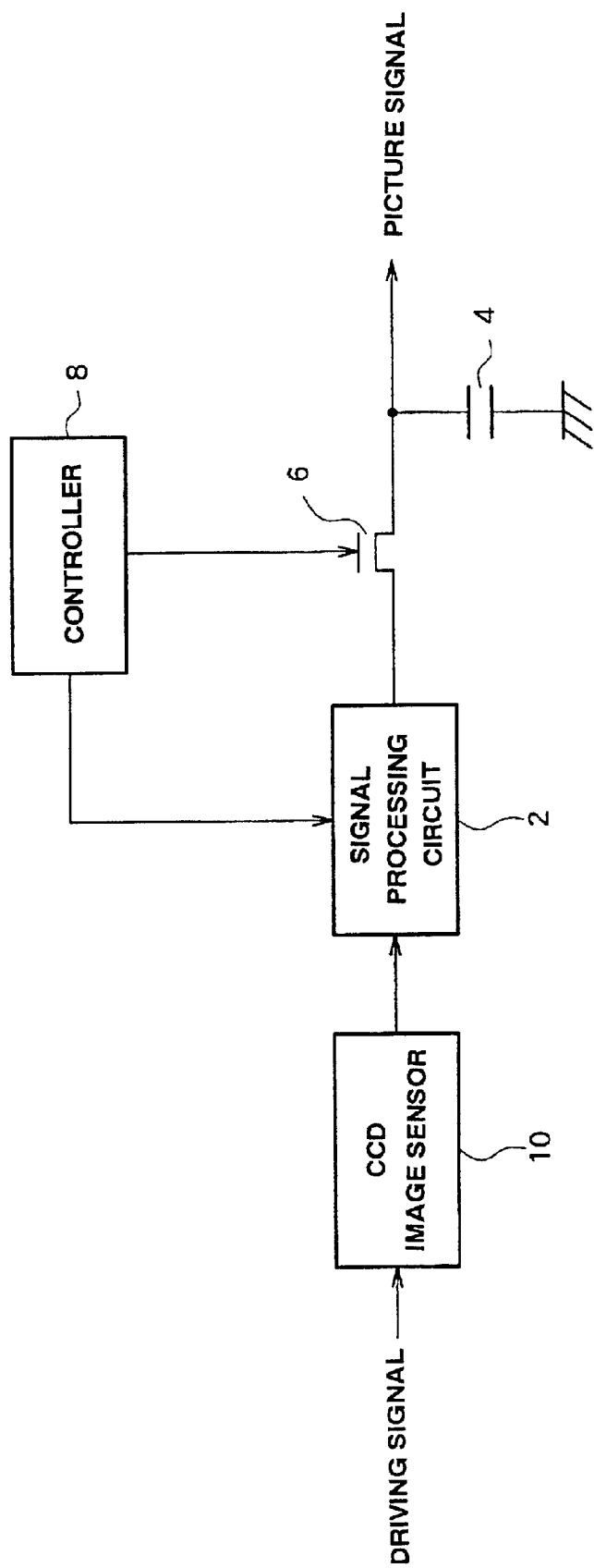
FIG. 1 is a schematic diagram of an integrated circuit for an image pickup device, which is an embodiment of the present invention.

FIG. 1 is a schematic diagram of an integrated circuit for an image pickup device, which is an embodiment of the present invention, and includes a circuit block that is controlled by a controller. An example will be described herein where the circuit block is a signal processing circuit. Shown in the figure are a circuit block 2, a capacitor 4, a switch 6, a controller 8, and a CCD image sensor 10.

The signal processing circuit, which is the circuit block 2, inputs an output signal from the CCD image sensor 10, performs a predetermined analog signal process, and outputs to a signal processing circuit block in a subsequent stage a generated picture signal. The capacitor 4 is connected between an output terminal of the circuit block 2 and ground. The capacitor 4 has a relatively large capacitance and has a function to absorb variations in and regulate the DC offset voltage at the output terminal. The switch 6 is a MOS transistor switch, for example, and is connected between the output terminal of the circuit block 2 and the capacitor 4. The controller 8 controls the on-off switching of the drive operation of the circuit block 2 as well as controls the on-off state of the switch 6.

Figure 2:
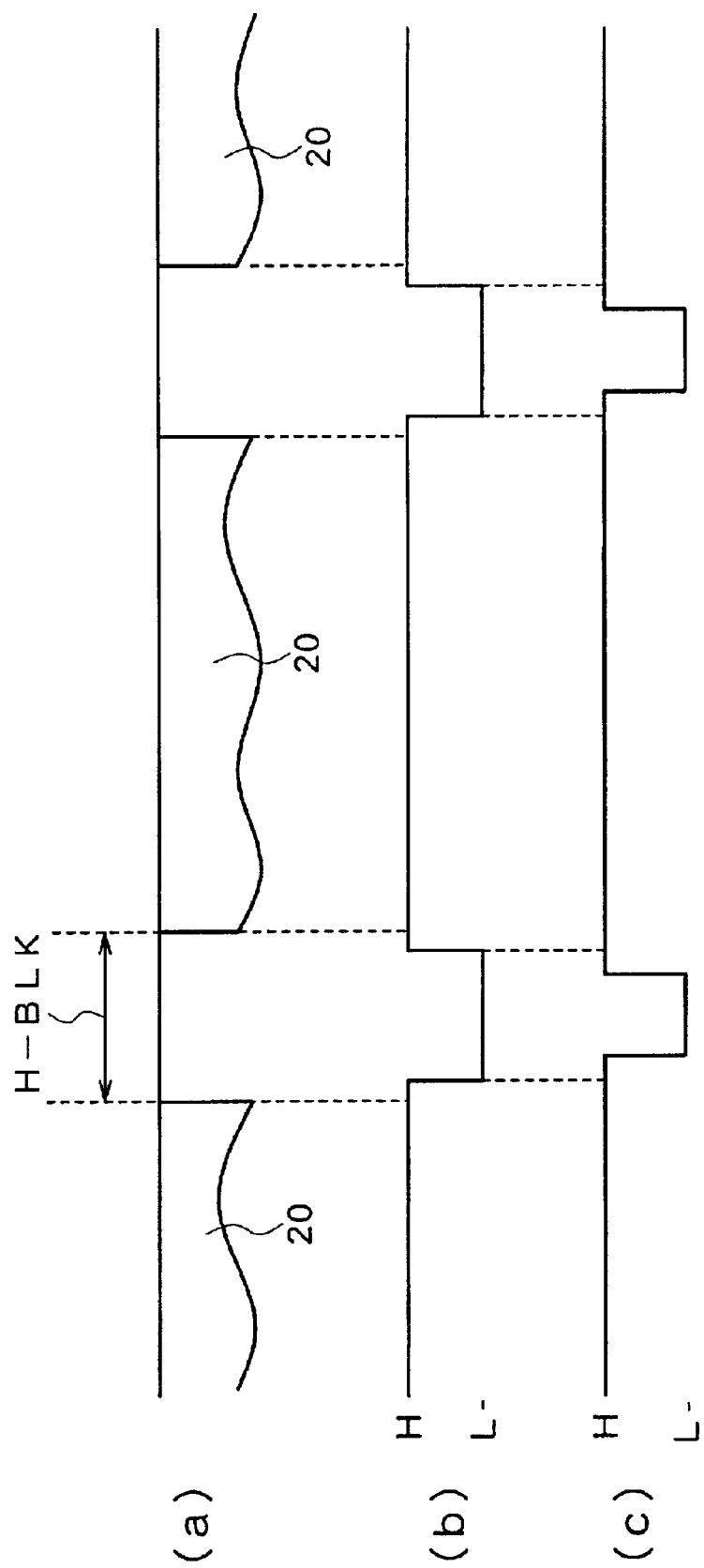
FIG. 2 illustrates the power dissipation reduction operation in the circuit of the embodiment.

FIG. 2 is a timing chart illustrating the power dissipation reduction operation in the circuit of the embodiment, where (a) depicts the CCD output signal, (b) depicts the control signal of the controller 8 for the switch 6, and (c) depicts the control signal of the controller 8 for the circuit block 2. The CCD output signal of (a) in the same figure depicts a horizontal blanking period H-BLK and an output signal 20 within a horizontal scanning period.

The control signal from the controller 8 for the switch 6, after H-BLK is entered, makes a transition from an H level to an L level causing the switch 6 to change from the on state to the off state, thereby disconnecting the picture signal from the circuit block 2. After the switch 6 changes to the off state, the control signal from the controller 8 for the circuit block 2 makes a transition from the H level to the L level causing the circuit block 2 to change from a driving state to a halt state so that the integrated circuit for the image pickup device enters the standby state.

In this manner, by turning the switch 6 off before stopping the circuit block 2, it is possible to avoid the influence on the capacitor 4 by the stopping of the circuit block 2. Namely, it is possible to avoid discharging, via the circuit block 2, the stored charge of the capacitor 4 in a steady-state during normal operation of the circuit block 2 or to avoid charging, by charges flowing via the circuit block 2, the capacitor 4 so as to exceed the steady state of normal operation. The capacitor 4 basically maintains the stored charge at the steady state in the normal operation of the circuit block 2.

Since the circuit block 2 must next perform signal processing for the output signal 20 corresponding to the next horizontal scan, the standby state is cleared before H-BLK terminates. Namely, within H-BLK, the resumption of the drive operation of the circuit block 2 and the connection of the circuit block 2 to a subsequent stage by the on state of the switch 6 are completed. The controller 8 first changes the control signal for the circuit block 2 from the L level to the H level to change the circuit block 2 from the halt state to the driving state. After the elapse of a predetermined time during which the driving state of the circuit block 2 basically stabilizes, the controller 8 changes the control signal for the switch 6 from the L level to the H level to change the switch 6 from the off state to the on state.

In this manner, by resuming the drive operation of the circuit block 2 before turning on the switch 6, the capacitor 4 avoids the influence of the circuit block 2 being in the stop state or the influence of the transient state at the resumption of the drive operation of the circuit block 2. Namely, if the circuit block 2 is still in the stop state or in the transient state when the switch 6 is turned on, it is possible for the stored charge of the capacitor 4 to discharge via the circuit block 2 or for charge to flow via the circuit block 2 and charge the capacitor 4 so as to exceed the steady state. However, it is possible to avoid these conditions. By clearing the standby state in this manner, it is possible for the capacitor 4 to basically maintain the amount of stored charge of the standby state.

Except for changes due to leakage or the like, the amount of stored charge of the capacitor 4 in the standby state basically corresponds to the amount of stored charge in the steady state prior to the stopping of the circuit block 2. Namely, by suppressing variations in the amount of stored charge of the capacitor 4 before the start and after the end of the standby state, the resetting from the standby state to the normal operation is performed rapidly. The amount the reset time to normal operation is shortened, the period of the standby state in H-BLK is extended and the amount of reduction in the power dissipation can be improved.

Although the operation of setting the standby state in H-BLK was described above, it is also possible to perform the standby operation in the vertical blanking period V-BLK to reduce the power dissipation during that period by using the present integrated circuit for the image pickup device. In this case, in the same fashion as the control for the above-mentioned H-BLK, it is possible for the controller 8 to control the timing at the start and at the end of the standby operation for the circuit block 2 and the switch 6.

Figure 3:
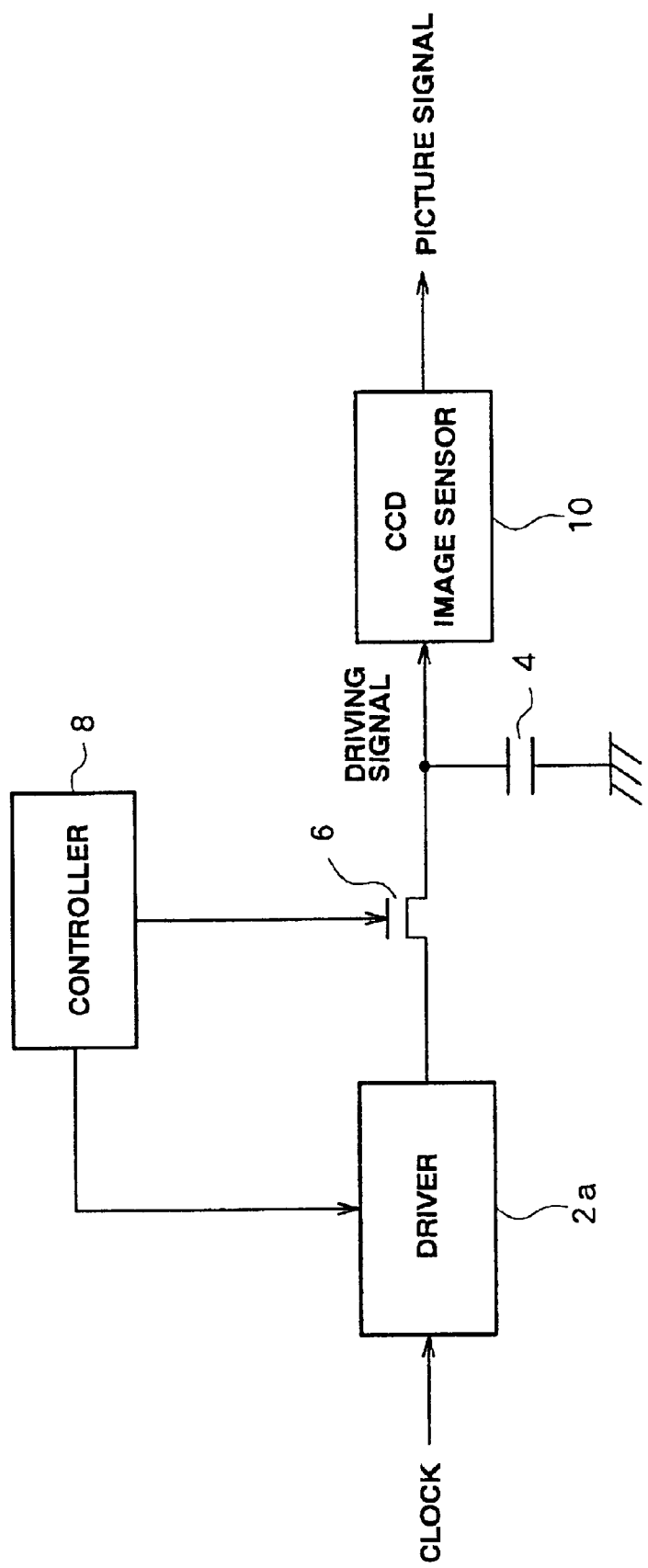
FIG. 3 is a schematic diagram of another integrated circuit for an image pickup device, which is an embodiment of the present invention.

Furthermore, although the case was described where the circuit block 2 is a signal processing circuit for the CCD output signal, as shown in FIG. 3, a driver 2a for supplying the driving signal to the CCD image sensor 10 is also the same. Namely, the standby operation becomes possible in V-BLK or H-BLK in a similar manner as shown in FIG. 2 also for the driver 2a so that the power dissipation can be reduced.

Furthermore, in the case where the capacitor for voltage regulation is provided at the input terminal of the circuit block, the switch is positioned between the input terminal and the capacitor and the standby operation is performed in the same fashion in V-BLK or H-BLK so that the power dissipation can be reduced.

In the above-mentioned configuration, the switch 6 was provided separately from the circuit block 2. However, a configuration in which the terminal connects to the capacitor 4 at a high impedance, namely, a transistor interrupting the output terminal in accordance with control by the controller 8 may be included within the circuit block.

According to the integrated circuit for the image pickup device of the present invention, the reset operation from the standby state to the normal operating state is accelerated, the circuit can be placed in the standby state in a short period, such as the vertical blanking period or the horizontal blanking period, and the power dissipation can be further reduced.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An integrated circuit, which is connected to an image pickup device and operates in synchronization with at least one of either a horizontal scan or a vertical scan for the image pickup device, the integrated circuit comprising:

a circuit block for at least one of either supplying a driving signal to said image pickup device or processing an output signal from said image pickup device;

a switch for selectively interrupting an output of said circuit block; and a controller for placing operation of said circuit block into a halt state and turning off said switch in at least one of either a horizontal scan blanking period or a vertical scan blanking period of said image pickup device;

the state of an output of said circuit block that was extracted immediately prior to turning off said switch is maintained by a predetermined capacitance during at least one of either the horizontal scan blanking period or the vertical scan blanking period of said image pickup device.

2. An integrated circuit for an image pickup device according to claim 1, wherein said controller, within at least one of either said vertical blanking period or said horizontal blanking period, after turning off said switch, shifts said circuit block to said halt state.

3. An integrated circuit for an image pickup device according to claim 1, wherein said controller, within at least one of either said vertical blanking period or said horizontal blanking period, after resuming the drive operation of said circuit block, turns on said switch.

* * * * *